United States Patent
Hein et al.

(10) Patent No.: US 9,265,165 B2
(45) Date of Patent: Feb. 16, 2016

(54) SEALING ELEMENT

(75) Inventors: Stefan Hein, Bensheim (DE); Martin Szelag, Bickenbach (DE); Andreas Herrmann, Mainz (DE)

(73) Assignee: TE Connectivity Germany GmbH, Bensheim (DE)

(*) Notice: Subject to any disclaimer, the term of this patent is extended or adjusted under 35 U.S.C. 154(b) by 146 days.

(21) Appl. No.: 13/695,999

(22) PCT Filed: Apr. 21, 2011

(86) PCT No.: PCT/EP2011/056440
§ 371 (c)(1),
(2), (4) Date: Jan. 11, 2013

(87) PCT Pub. No.: WO2011/138182
PCT Pub. Date: Nov. 10, 2011

(65) Prior Publication Data
US 2013/0099452 A1    Apr. 25, 2013

(30) Foreign Application Priority Data
May 5, 2010  (DE) .......................... 10 2010 019 600

(51) Int. Cl.
*H02G 3/18*    (2006.01)
*H05K 5/02*    (2006.01)
(Continued)

(52) U.S. Cl.
CPC .............. *H05K 5/02* (2013.01); *H01R 13/5205* (2013.01); *H02G 3/0658* (2013.01); *H02G 15/013* (2013.01)

(58) Field of Classification Search
CPC .... H01R 13/5205; H01R 13/521; H05K 5/02; H02G 15/013; H02G 3/0658
USPC ........... 439/604, 281, 276, 271, 460; 29/844; 174/660, 173 G, 650, 654
See application file for complete search history.

(56) References Cited

U.S. PATENT DOCUMENTS 3,911,203 A * 10/1975 Goldowsky .......... H02G 3/0658
                                                              174/138 F
4,283,597 A *  8/1981 Cooper, Jr. .................. 174/138 F
(Continued)

FOREIGN PATENT DOCUMENTS

EP          1089411 A1      4/2001
JP       2005229711 A       8/2005

OTHER PUBLICATIONS

English translation EP1089411.*
(Continued)

*Primary Examiner* — Steven T Sawyer
(74) *Attorney, Agent, or Firm* — Faegre Baker Daniels LLP

(57) ABSTRACT

The invention relates to a sealing element (1) for sealing between an electric line (2) and a housing (100). In order to provide a sealing element (1) for a plurality of different line diameters, provision is made according to the invention for the sealing element (1) to have an elastically expandable inner sleeve (5) which has, in an axial direction (X) of the sealing element (1), a passage opening (4) for the line (2) which has at least one inner sealing surface (6a, 6b) extending along its inner periphery (6), an outer sleeve (10) surrounding the inner sleeve (5), which outer sleeve has at least one outer sealing surface (11a, 11b) extending along its outer periphery (11), and comprises at least one compensation section (7a-d) which is designed to be compressible in a radial direction (Y, Z) of the sealing element (1) and has a yieldingness which is greater than the yieldingness of the outer sleeve (10).

19 Claims, 8 Drawing Sheets

(51) Int. Cl.
*H01R 13/52* (2006.01)
*H02G 3/06* (2006.01)
*H02G 15/013* (2006.01)

(56) References Cited

U.S. PATENT DOCUMENTS

| | | | | |
|---|---|---|---|---|
| 4,692,562 | A | * | 9/1987 | Nattel .................. H02G 15/013 174/653 |
| 6,590,160 | B1 | * | 7/2003 | Dopfl ........................... 174/650 |
| 2003/0070829 | A1 | * | 4/2003 | Koessler .............. H02G 15/013 174/667 |
| 2007/0105428 | A1 | | 5/2007 | Cawood et al. |
| 2007/0160193 | A1 | | 7/2007 | Vo et al. |
| 2009/0181577 | A1 | | 7/2009 | Zahnen et al. |
| 2009/0258522 | A1 | | 10/2009 | Bracci et al. |
| 2010/0255703 | A1 | * | 10/2010 | Yoshioka et al. ............. 439/273 |

OTHER PUBLICATIONS

International Search Report and Written Opinion issued by the European Patent Office, dated Jul. 28, 2011, for related International Application No. PCT/EP2011/056440; 12 pages.

Examination Report issued by the European Patent Office, Munich, Germany, for European Patent Application No. EP 11718689.0, dated Jul. 28, 2015; 5 pages.

* cited by examiner

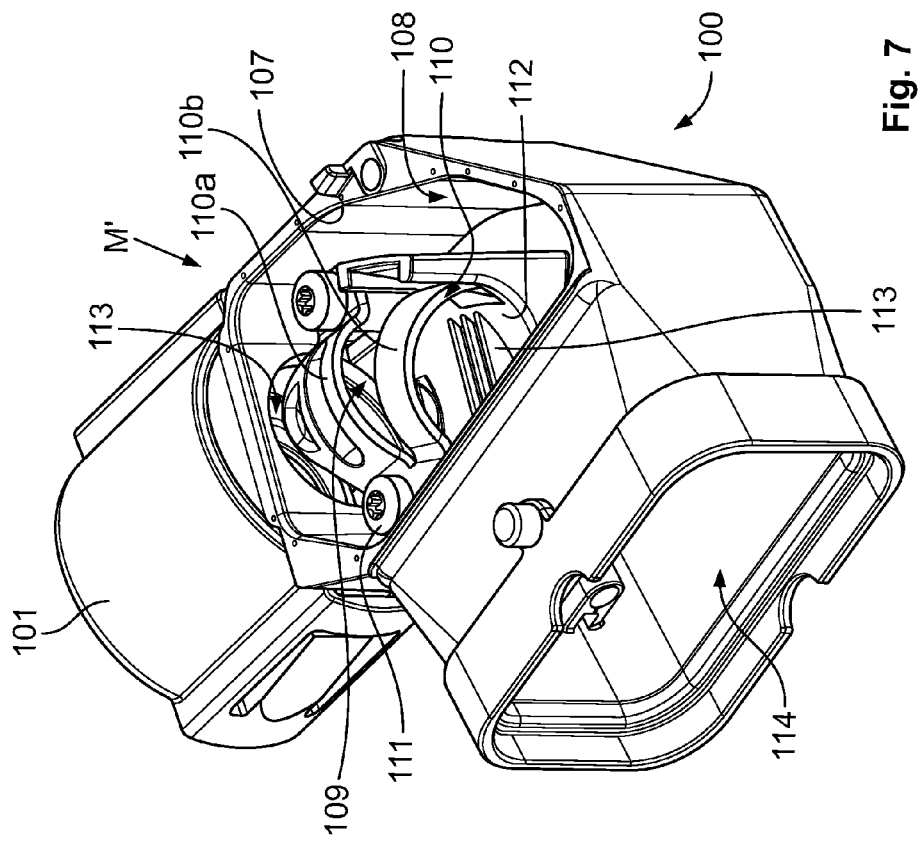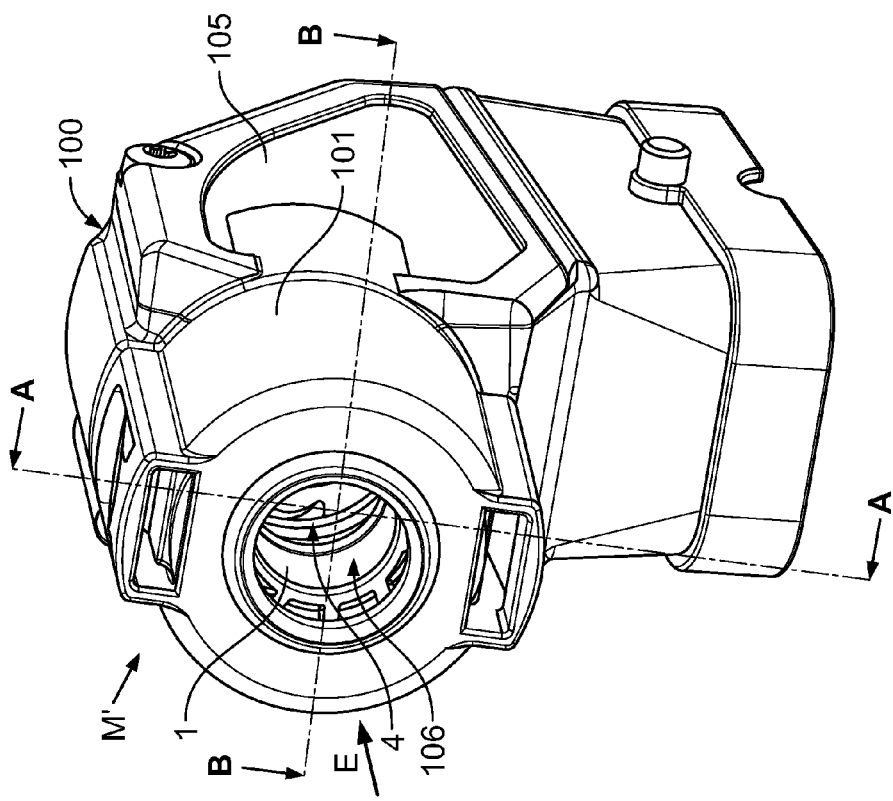

SEALING ELEMENT

The invention relates to a sealing element for sealing between an electric line and a housing.

Such sealing elements are used for example in line passages of housing walls in order to seal off the interior of the housing from the surroundings of the housing at the cable gland. A contour of the sealing element is designed complementarily to the contour of the leadthrough in the wall of the housing. An internal contour or an internal diameter is adapted to the external contour of the electric line. Thus these sealing elements are suitable as a rule only for lines of a given diameter.

In order to be able to seal off the housing and lines of different diameters between the cable glands, according to the prior art either the sealing elements are adapted individually to the line cross-sections and are thus only suitable for a given line type, or the internal contours of the sealing elements are provided with lamellae of different lengths extending in the radial direction, which lamellae predetermine passage openings of different diameters.

Both solutions in accordance with the prior art are not capable of giving complete satisfaction, because firstly a plurality of different sealing elements has to be provided for different line types, which can be complex and therefore expensive. On the other hand, sealing elements the inner periphery of which has a plurality of lamellae which define leadthroughs of different diameters can be used in a more versatile manner. However, the latter solution represents only a compromise, because the sealing elements cannot seal equally well on lines of different diameters.

In view of the disadvantages in the prior art described above, it is an object of the invention to provide a sealing element for lines of different cross-section which guarantees a high degree of sealing as constant as possible for a plurality of different line diameters.

This object is achieved according to the invention in that the sealing element has an elastically expandable inner sleeve which has, in an axial direction of the sealing element, a passage opening for the line which has at least one inner sealing surface extending along its inner periphery, an outer sleeve surrounding the inner sleeve, which outer sleeve has at least one outer sealing surface extending along an outer periphery of the sealing element, and comprises at least one compensation section which is designed to be compressible in a radial direction of the sealing element and has a yieldingness which is greater than the yieldingness of the outer sleeve.

This solution has the advantage that an increase in the inner periphery of the sealing element on the inner sleeve is at least proportionately compensated in that it results, in the radial direction, in an increase in the outer periphery of the outer sleeve which is smaller compared with the increase in the inner periphery. Thus the inner sleeve can be expanded within a tolerance range of the sealing element without excessive pressure acting on the outer sleeve, which in turn may be either inelastic itself or at least be arranged in an inelastic passage, which prevents the expansion thereof. A certain inner expansion of the sealing element has no, or if at all only a slight, influence on the external diameter of the sealing element.

Consequently, the invention permits lines to be passed through the seal, the outer periphery of which has at an upper limit of the tolerance range for the line diameter which can be received in the seal, without the line being excessively greatly compressed in the passage opening, which facilitates pulling the line through the seal. This is relevant above all since the sealing elements are mostly manufactured from elastic material with a high coefficient of friction which tends to make movements of the line in the axial direction through the sealing element more difficult. The invention makes it possible to displace a sealing element pushed onto the line in a seal receptacle of the housing with different line diameters under largely identical conditions, in order to position it for example.

The solution according to the invention can be supplemented and improved further as desired by the following further embodiments which are each advantageous per se:

Thus, according to a first further embodiment it is possible for the inner sleeve, at least in sections, to be held in movable manner in the radial direction relative to the outer sleeve. Thus the inner sleeve can not only adapt, lying concentrically to the outer sleeve, to the external contour of the line, but additionally can orient its position to the position of the line.

In order to hold the line as fixed as possible in the sealing element in the axial direction, according to a further advantageous embodiment provision may be made for the yieldingness of the compensation section in the radial direction to exceed the yieldingness of the compensation section in the axial direction. Thus for example the line can be pushed through the leadthrough without the inner sleeve being displaced in the axial direction relative to the outer sleeve.

According to a further embodiment, the compensation section can be provided simply in that the compensation section comprises a region of weakness and/or a recess which extends, at least in sections, along the inner and/or the outer periphery. In the region of weakness, the elasticity, compressibility and/or yieldingness of the compensation section may be increased relative to the inner sleeve and/or outer sleeve. For this, the region of weakness may for example be formed from softer material than the inner sleeve and/or the outer sleeve. For example, material of the sealing element which is displaced upon inserting the line into the sealing element can move out of the way into a peripheral recess.

Weakening of the compensation section can be achieved simply in that at least one cutout is formed in the compensation section between the inner and the outer sleeve, by means of which cutout the yieldingness of the compensation section is increased.

According to a further advantageous embodiment, provision may be made for the compensation section to comprise ribs arranged in a spoke-like manner which, at least in sections, hold and/or encompass the inner sleeve on the outer sleeve. Thus the inner sleeve can be connected to the outer sleeve such that axial displacements of the inner sleeve relative to the outer sleeve can be prevented. Also, it is thus possible to prevent the inner sleeve or a collar forming it, a sealing ring and/or a spring leg, from being folded over and/or bent down upon pulling the line through the leadthrough.

A high degree of yieldingness of the ribs in the radial direction can be achieved in that the ribs, at least in sections, may extend obliquely to a radius line which starts from an axial centre line of the sealing element.

The yieldingness of the compensation section, according to a further possible embodiment, can be increased further in that the compensation section in the passage opening has an inner recess which, at least in sections, is set back relative to the sealing surface. Thus the passage opening is widened, at least in sections, in the radial direction.

A recess along the outer periphery may for example be configured as at least one annular groove. A sealing lip may extend in the annular groove along the peripheral direction of the at least one annular groove. The sealing lip can surround the outer periphery of the sealing element in annular manner and ensure particularly good sealing between the outer periphery of the sealing element and the housing.

The tightness and also a desired dimensional stability of the sealing element can be achieved according to a further possible embodiment in that the inner sleeve is connected to the outer sleeve via a peripheral connecting web. In order to ensure a high degree of yieldingness and/or elasticity of the sealing element despite the connecting web, provision may be made for the connecting web to be arranged in the axial direction substantially at the level of the inner recess and/or of the at least one annular groove.

A high degree of flexibility and deflectability of the inner sleeve can be achieved according to a further embodiment in that a spring leg which in an axial cross-section of the sealing element, at least in sections, extends obliquely to a central axis of the sealing element holds at least one inner sleeve in radially resilient manner.

The tightness of the sealing element in a contact region between the line and the leadthrough can be improved in that the inner sleeve comprises at least one front sealing ring and at least one rear sealing ring which are spaced apart from each other in a direction of introduction of the sealing element which extends parallel to the axial direction. If provision is made according to a further possible embodiment for the radial deflectability of the at least one rear sealing ring to be greater than the radial deflectability of the at least one front sealing ring, good adaptability of the inner sleeve to the position of the line can be achieved.

The invention is explained in greater detail below by way of example using several embodiments with reference to the appended drawings. The embodiments merely represent possible configurations in which individual features, as described above, can be realised and omitted independently of each other. In the description of the embodiments, for simplicity the same features and elements are provided with the same reference numerals.

Therein:

FIG. 6 depicts a diagrammatic perspective view of a housing provided with a sealing element according to the invention in a further assembly position M';

FIG. 7 depicts a diagrammatic perspective view of the housing shown in FIG. 6 with opened housing cover;

Figure 1:
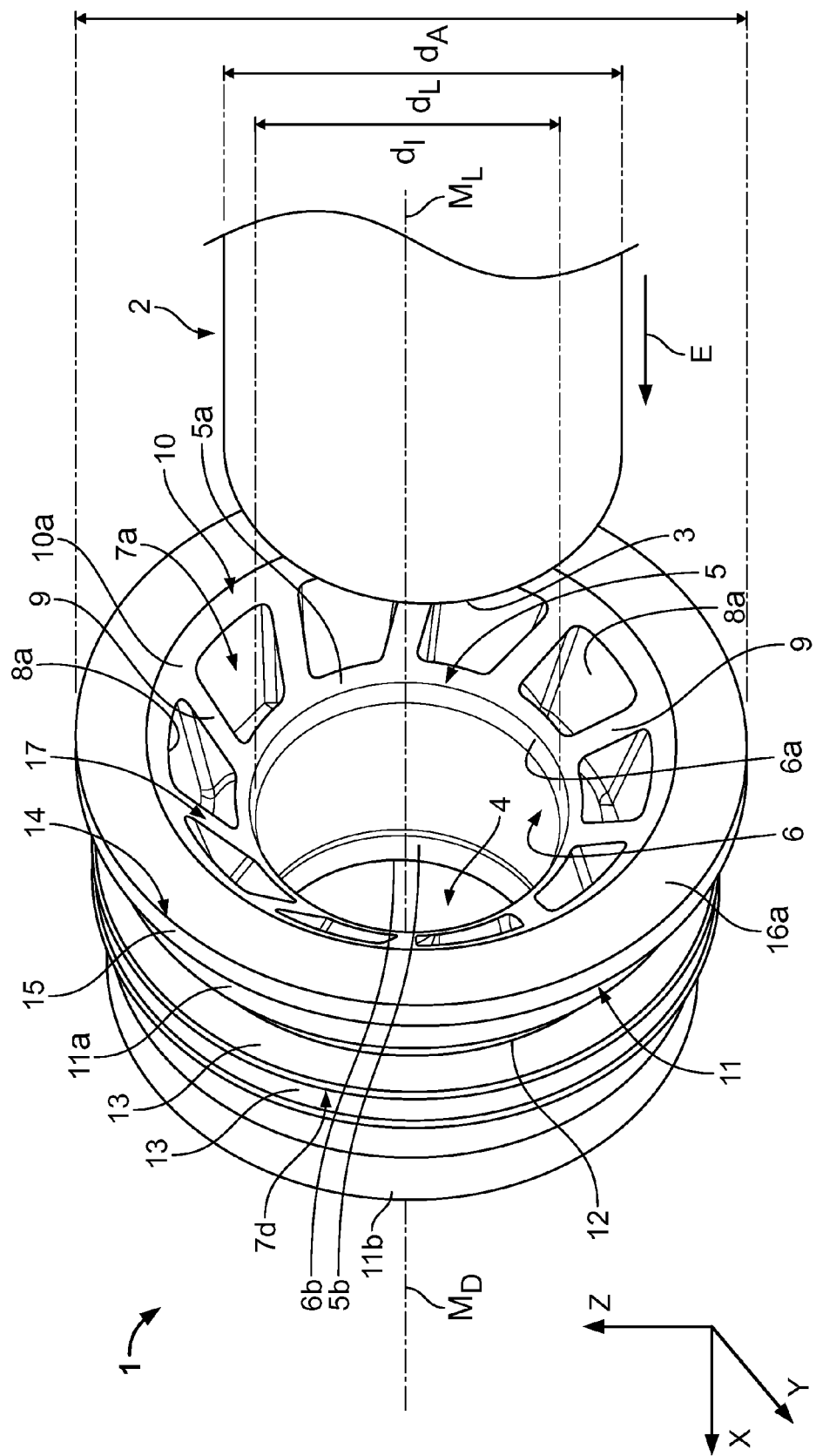
FIG. 1 depicts a diagrammatic perspective view of a sealing element according to the invention and an electric line.

First of all, a sealing element 1 according to the invention is described with reference to FIG. 1, which shows the sealing element 1 and an electric line 2, for example a cable. The line 2 is arranged with its axial centre line $M_L$ on an axial centre line $M_D$ of the sealing element 1. A free end 3 of the electric line is arranged in a direction of introduction E of a passage opening 4 of the sealing element 1. An external diameter $d_L$ of the electric line 2 is greater than an internal diameter $d_I$ of the passage opening 4 and smaller than an external diameter $d_A$ of the sealing element 1.

The passage opening 4 extends parallel to an axial direction X of the sealing element and, at least in sections, is formed by two elastic inner sealing rings 5a, 5b an inner sleeve 5 of the sealing element 1. The inner sealing rings 5a, 5b have inner sealing surfaces 6a, 6b of the sealing element 1 which form an inner periphery of the sealing element 1.

In a radial direction Y, Z of the sealing element 1, the inner sealing ring 5a is surrounded by a compensation section 7a. The compensation section 7a comprises a series of cutouts 8a which extend in the axial direction X between the inner sleeve 5, spoke-like ribs 9 and an outer sleeve 10 of the sealing element 1. The outer sleeve 10 in this example of embodiment comprises two outer sealing rings 10a, 10b.

An outer sealing surface 11a of the sealing element 1 is formed on an outer periphery 11 of the outer sleeve 10a. Furthermore, the outer periphery 11 of the sealing element 1 is provided with a peripheral recess, i.e. one extending along the outer periphery 11, in the form of an annular groove 12, in which two peripheral sealing lips 13 which extend parallel to each other are arranged. The annular groove 12 and the sealing lips 13 form a further compensation section 7d of the sealing element 1. In the direction of introduction E, lying behind the further compensation section 7d, the sealing element 1 has a further outer sealing surface 11b.

Further, the sealing element 1 is provided with a collar 14 which faces counter to the direction of introduction E, the peripheral edge 15 of which forms a maximum outer periphery of the sealing element 1. An axial edge of the collar 16 faces counter to the direction of introduction E. A funnel-shaped entry contour 17 extends conically towards the passage opening 4 between the axial edge 16 and the inner sealing surface 6a, and serves as an entry contour 17 for the line 2 in the direction of introduction E.

Figure 2:
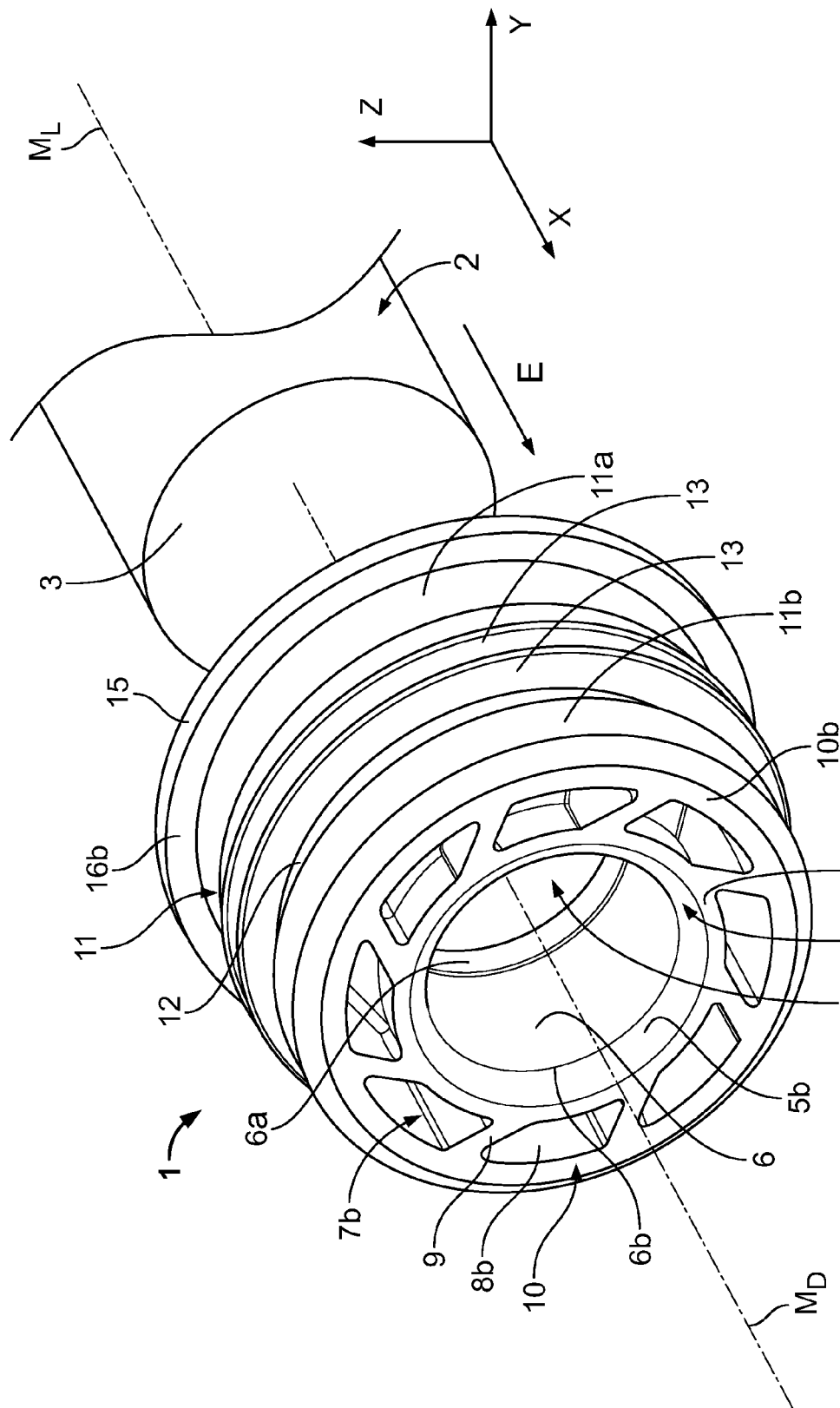
FIG. 2 depicts a further diagrammatic perspective view of the sealing element shown in FIG. 1 and the electric line.

FIG. 2 shows the sealing element 1 in a further diagrammatic perspective view with a view through the leadthrough 4 counter to the direction of introduction E. In this view, it becomes clear that the inner periphery 6 forms the inner sealing surface 6b on a further inner sealing ring 5b. In the radial direction around the further inner sealing ring 5b there is arranged a further compensation section 7b which, analogously to the compensation section 7a, has a plurality of cutouts 8b which are formed in the axial direction X between spoke-shaped ribs 9, of the inner sealing ring 5b and of a further outer sealing ring 10b. The ribs 9 extend, in the radial direction Y, Z, obliquely to radii which start from the centre line $M_D$ of the sealing element. In other words, a respective longitudinal axis of the ribs 9 extends tangentially to a circular line running around the centre line $M_D$.

Figure 3:
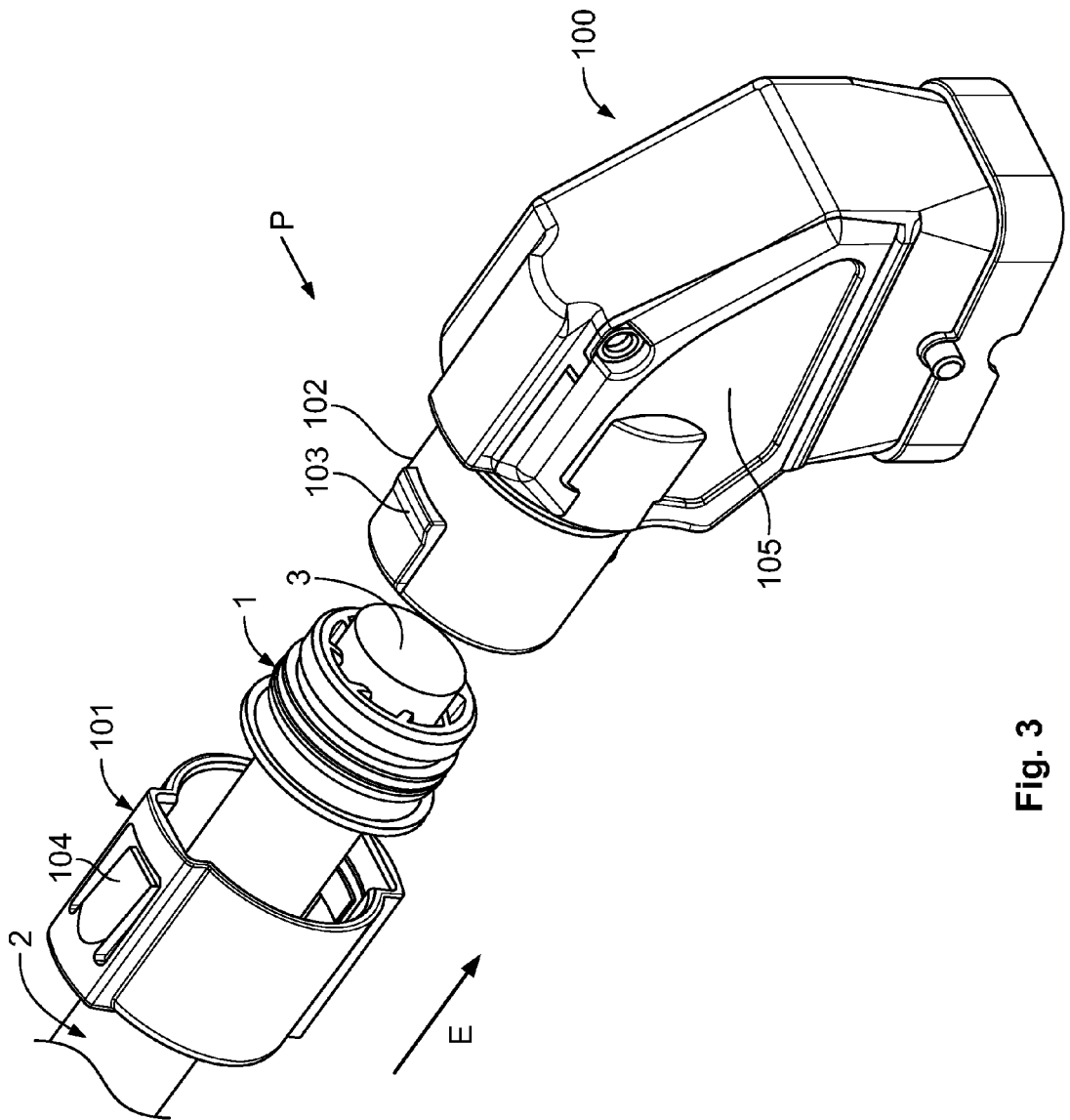
FIG. 3 depicts a diagrammatic perspective view of a sealing element according to the invention, an electric line and a housing in a pre-assembly position.

FIG. 3 shows the sealing element 1, the line 2 and a housing 100 and a cap 101 for the housing in a diagrammatic perspective view in a pre-assembly position P. In the pre-assembly position P, the cap 101 is pushed on to the electric line 2 counter to the direction of introduction E. The sealing element 1 is pushed on to the electric line 2, located before the cap 101 in the direction of introduction E. The free end 3 of the electric line 2 is arranged in the direction of introduction E before a port-shaped line guide 102 of the housing 100. A latch element 103 is attached externally to the line guide 102, which element is designed to cooperate with a mating latch element 104 of the cap 102. The latch element 103 is designed as a latch projection and the mating latch element 104 as a latch tab. The housing 100 is a surrounding housing of a plug-and-socket connector, which laterally has an access (not yet shown here) which is closed with a cover 105.

Figure 4:
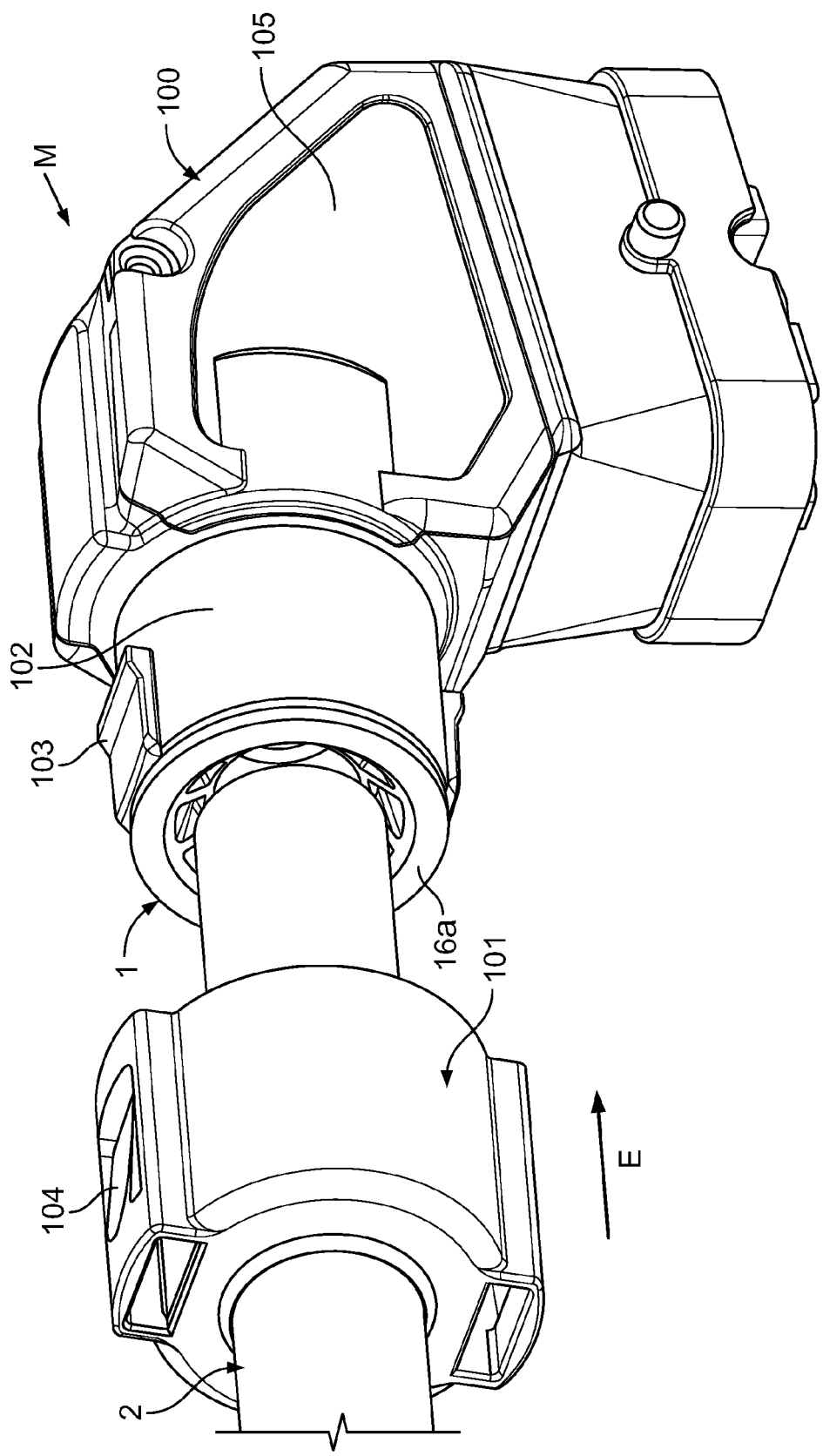
FIG. 4 depicts a diagrammatic perspective view of the sealing element shown in FIG. 3, the electric line and the housing in an assembly position.

FIG. 4 shows the sealing element 1, the line 2, the housing 100 and the cap 101 in a further diagrammatic perspective view in an assembly position M. In the assembly position M, the seal 1 is inserted into an inlet (not yet shown here) in the housing 100 which is formed by the line guide 102. The line 2 thus extends through the line guide 102 into the housing 100. The cap 101 is ready to be pushed over the line guide 102 in the direction of introduction E and to be latched thereto.

Figure 5:
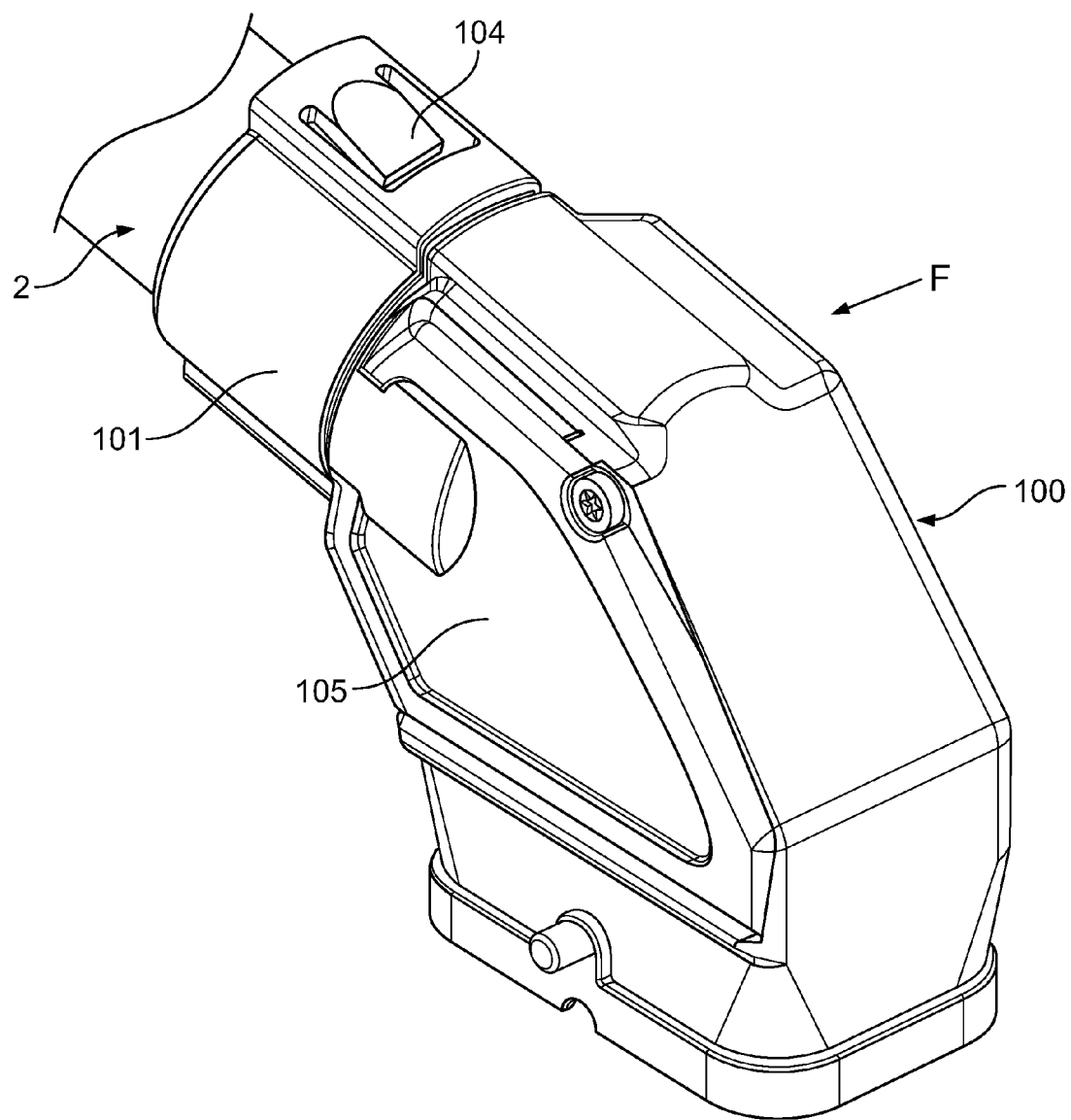
FIG. 5 depicts a diagrammatic perspective view of the sealing element shown in FIGS. 3 and 4, the electric line and the housing in a final assembly position.

FIG. 5 shows the sealing element 1, the line 2, the housing 100 and the cap 101 in a further diagrammatic perspective view in a final assembly position F. In the final assembly position F, the line 2 is guided through the sealing element 1 into the housing 100. The cap 101 is latched to the housing 100, covers the sealing element 1 and holds the sealing element 1 in position on its collar 14.

FIG. 6 shows the sealing element 1, the housing 100 and the cap 101 in a further assembly position M'. In the assembly position M', the sealing element 1 is inserted into the housing 100 and the cap 101 is latched to the housing 100 in a similar manner to FIG. 5. A circular passage 106 for the line 2 is formed in the cap 101. The circular passage 106 is arranged concentrically to the passage opening 4 of the sealing element 1.

FIG. 7 shows the housing 100 with the cap 101 placed on and the sealing element 1 inserted, in a further diagrammatic perspective view in the assembly position M'. Behind the cover 105 there is an assembly opening 107 to an inner chamber 108 of the housing 100. A line holder 109 designed as a strain-relief means is arranged in the inner chamber 108. The line holder 109 comprises a cable clamp 110, which can be fixed in the housing with the aid of fastening means 111 in the form of screws, and also a pressure application region 112 which is provided with holding projections 119 in the form of transverse ribs. The cable clamp 110 has a line fixing section 110a for mechanically fixing the line 2 to the insulation thereof and a screen contact section 110b for electrically contacting a screen of the line 2. A line inlet 113 is designed to guide the line 2 in line holder 109 upon introduction into the housing 100. Further, the housing 100 has a plugging section 114 which is designed to receive plug-in contact elements (not shown) which can be attached to the line.

Figure 8:
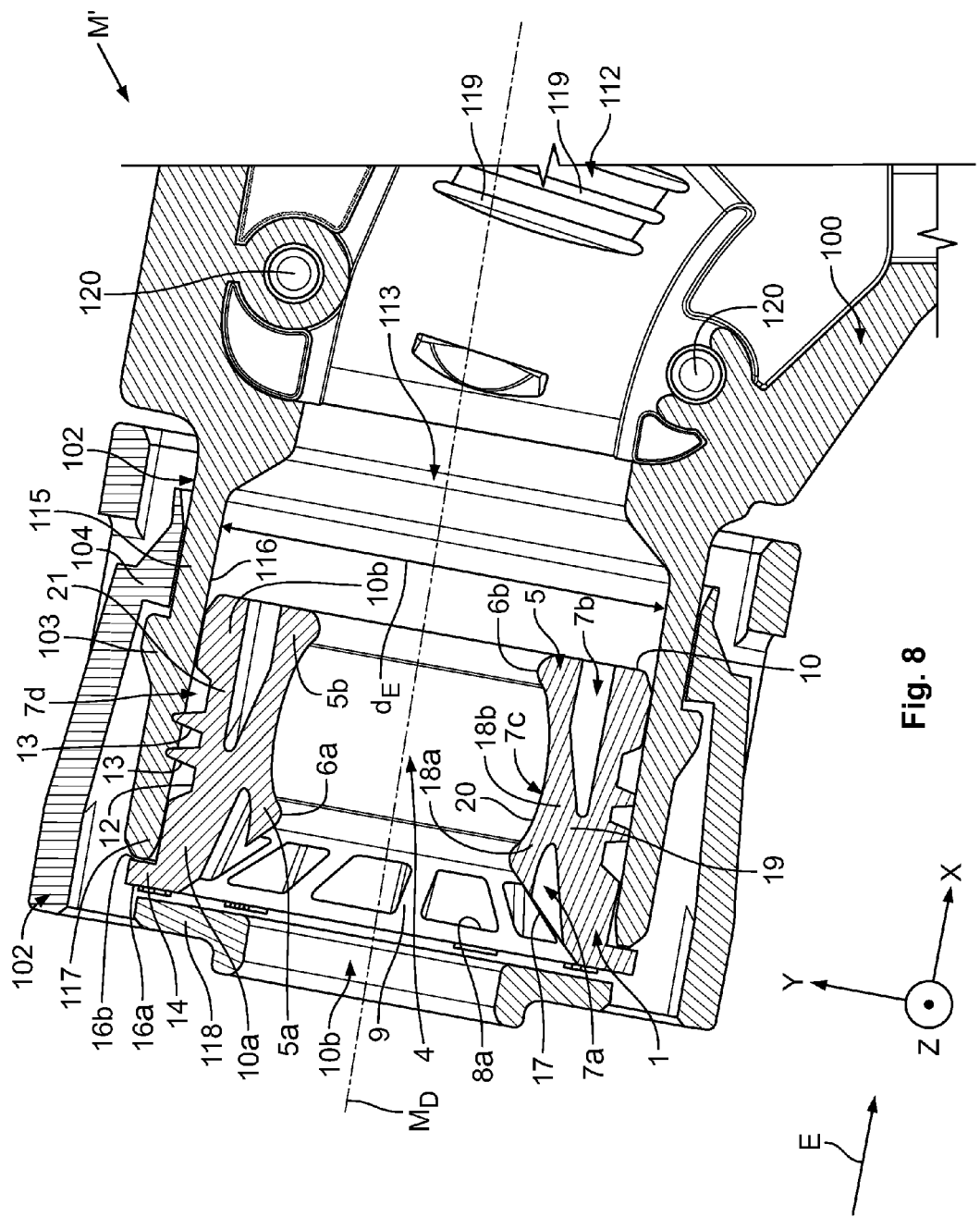
FIG. 8 depicts a diagrammatic cross-sectional view of a section of the housing shown in FIG. 6 with sealing element inserted therein, along the section line A-A in FIG. 6.

FIG. 8 shows the housing 100 illustrated in FIG. 6 with the inserted sealing element 1 in the assembly position M' along the section line A-A in FIG. 6. The sealing element 1 is seated in the line guide 102 and lies peripherally against a seal receptacle 116, formed by a wall 115 of the housing 100, which is cylindrical. The passage opening 4 is arranged concentrically to the seal receptacle 116 and to the line inlet 113. The outer sealing rings 10a, 10b lie with their respective outer sealing faces 11a, 11b against the wall 115 of the seal receptacle 116.

The inner sealing rings 5a, 5b are held in movable manner in the radial direction Y, Z on respective spring legs 18a, 18b formed in the cross-section of the sealing element 1. The spring legs 18a, 18b merge into each other in the region of an annular connecting web 19. The spring leg 18a bearing the front inner sealing ring 5a, in the direction of introduction E, is shorter than the spring leg 18b bearing the rear inner sealing ring 5b arranged in the direction of introduction E at a distance from the front inner sealing ring 5a. Thus a movability of the rear inner sealing ring 5b in the radial direction Y, Z is greater than a movability of the front inner sealing ring 5a. Between the inner sealing rings 5a, 5b, the spring legs 18a, 18b extend, curved outwards, in arcuate manner in the axial direction Y, Z such that an annular inner recess 20 is formed between the inner sealing rings 5a, 5b or the inner sealing surfaces 6a, 6b thereof. Due to the inner recess 20, the sealing rings 5a, 5b may both be moved outwards or widened in the radial direction Y, Z for example in rotary manner and/or radially, without the spring legs 18a, 18b coming to lie against the line 2. Thus the inner recess 20 forms a further compensation section 7c.

The connecting web 19 may act as a type of rotary bearing point or lever articulation, about which the spring legs 18a, 18b are mounted in rotatable or tiltable manner up to a certain degree. In other words, the spring legs 18a, 18b form a rocker mounted in the connecting web 19 which permits radial displacement and/or tilting movements of the spring legs 18a, 18b. The compensation sections 7a, 7b are arranged in the radial direction lying around the spring legs 18a, 18b and the inner sealing rings 5a, 5b. Thus the spring legs 18a, 18b and the inner sealing rings 5a, 5b can move out of the way into the respective compensation section 7a, 7b arranged between the inner sealing rings 5a and 5b and the outer sealing rings 10a and 10b respectively, if the line 2 expands the passage opening 4.

The connecting web 19 is arranged in the axial direction X or in the direction of introduction E at the level of the annular groove 112, which forms an outer recess of the sealing element 1. This recess represents a further compensation section 7d, which may be more elastic than the outer sealing rings 10a, 10b, at least in the radial direction Y, Z. Thus forces which are to be dissipated outwards in the radial direction Y, Z via the connecting web 19 can deform a wall 21 of the seal outwards in the radial direction Y, Z. In this case, it is advantageous that the two radial sealing lips 13 are pressed against the wall 115 of the seal receptacle 110 and ensure a double seal, firstly from the external surroundings and secondly from the interior of the housing 18, without in so doing making it difficult to assemble the housing 100, the sealing element 1 and the line 2 due to considerable additional friction on the wall 115.

Furthermore, the axial edge 16b of the collar 14 lies on the sealing element 1 in the direction of introduction E on an edge 117 of the seal receptacle 116. A facing 118 of the cap 102, which forms the passage 106 in the cap 102, is located in the direction of introduction E in front of the axial edge 16a of the collar 14 such that the sealing element 1 in the axial direction X is held at the collar 14 substantially non-displaceably between the edge 117 and the facing 118.

Further, it can be seen in FIG. 8 that the pressure application region 112 of the housing 100 comprises a plurality of transverse ribs 119 which extend substantially transversely to the direction of introduction E. Counter-fastening means 120 on the housing 100 for the fastening means 111 are designed as screw receptacles.

Figure 9:
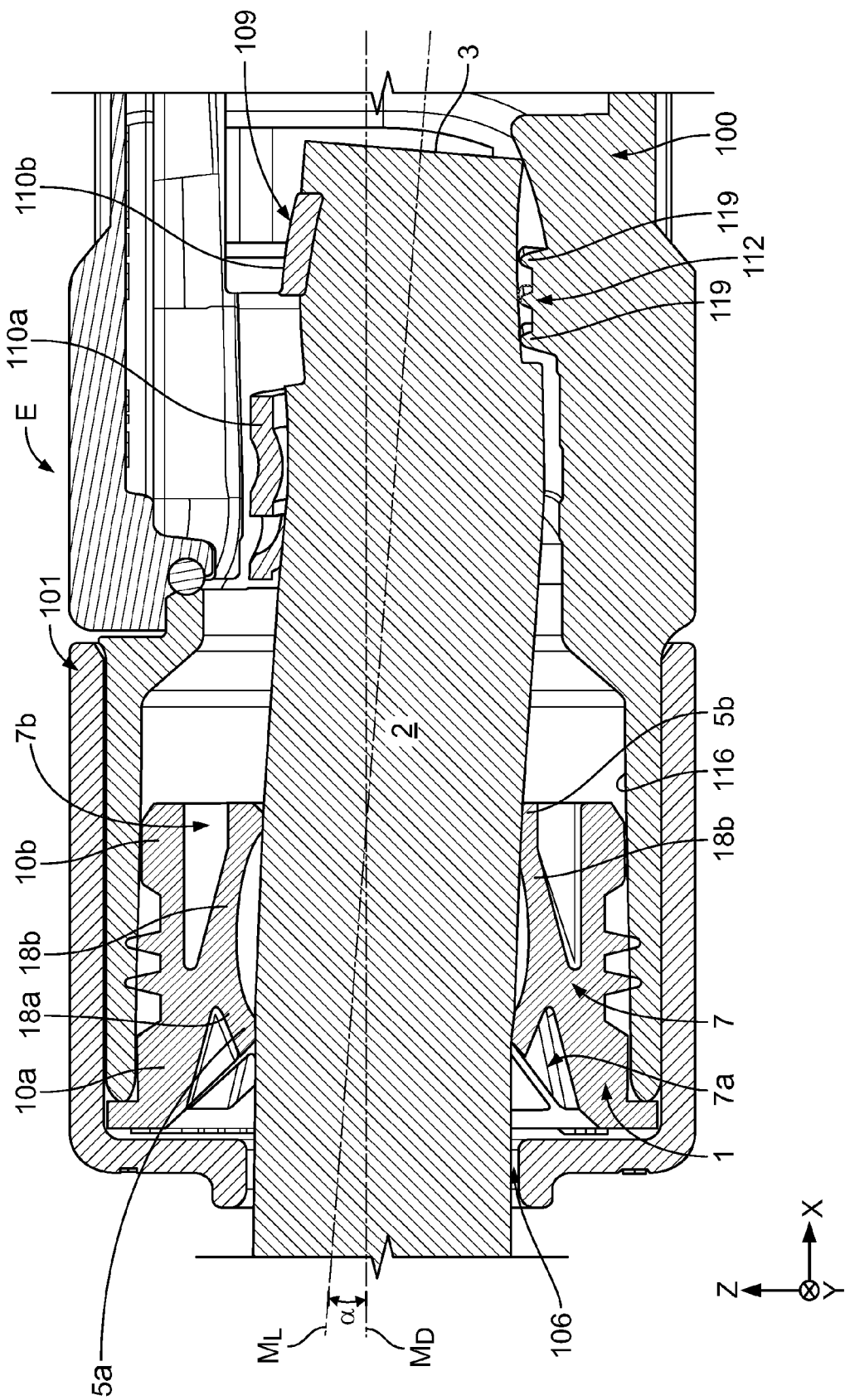
FIG. 9 depicts a diagrammatic perspective view of a section of the housing shown in FIG. 6 with sealing element inserted therein, along the section line B-B in FIG. 6.

FIG. 9 shows the sealing element 1, the line 2, the housing 100 and the cap 101 in the final assembly position E. The line 2 extends through the passage 106 into the housing 100 and is guided through the passage opening 4 of the sealing element which is inserted into the seal receptacle 116 as in FIG. 8. In the region of its free end 3, the line 2 is fastened in the line holder 109, in which it is pressed by the cable clamp 110 counter to the radial direction Z against the transverse ribs 119 of the pressure application region 112. The line 2 extends in the axial direction X at the level of the passage 106 substantially concentrically to the passage 106 and to the inner sealing ring 5a.

On its way along the direction of introduction E into the housing 100, the line, due to its fastening by means of the cable clamp 109 which pushes it down, undergoes a deflection counter to the radial direction Z. Thus the axial centre line $M_L$ of the line 2 is tilted relative to the axial centre line $M_D$ of the sealing element 1 by an angle α and/or is displaced parallel to the radial direction Z. This tilting or displacement can be compensated thanks to the movable suspension of the inner sealing ring 5b on the spring leg 18b, since the latter can move out of the way into the compensation section 7b without coming to lie on the outer sealing ring 10b. Since a diameter $d_E$ of the seal receptacle 116 in a non-expanded state of the sealing element 1 may be substantially greater than or equal to the diameter of the sealing element 1 on the outer sealing rings 10a, 10b, the outer sealing rings 10a, 10b may possibly not be expanded, or have no or only hardly any space to move out of the way.

Within the inventive concept, deviations from the embodiments described above are possible.

Thus the sealing element 1 and the electric line 2 do not inevitably have to be designed rotationally symmetrically to their centre line $M_D$ or $M_L$ respectively, but may have a different cross-section corresponding to the respective requirements. Correspondingly, also the passage opening 4 of the sealing element 1 can be adapted to a corresponding external contour 2 of the line.

Any number of inner sealing rings 5a, 5b whatsoever can be provided and combined on the inner sleeve 5, and each may form inner sealing surfaces 6a, 6b. The compensation sections 7a to 7d may be arranged in any manner whatsoever between the inner sealing rings 5a, 5b and the outer sealing rings 10a, 10b, in order to ensure radial movability of the inner sleeve 5, and jointly form a compensation zone 7 which may also comprise the spring legs 18a, 18b and the connecting web 19. Also, the compensation sections 7a to 7d may be arranged in the form of recesses on the inner or outer periphery between a plurality of outer sealing rings 10a, 10b or inner sealing rings 5a, 5b in order to ensure a greater degree of yieldingness of the inner sleeve 5.

It is advantageous, but not absolutely necessary, if the sealing element 1, as in the present case, is designed in one piece and formed overall of elastic material. Thus it is for example conceivable for the outer sleeve 10 to be formed from less-elastic material than the inner sealing rings 5a, 5b. The inner sleeve 5 and its spring legs 18a, 18b may in each case form an elastically deflectable collar which in each case surrounds the line 2 with its inner sealing surface 6a or 6b respectively.

It is not absolutely necessary to connect the inner sleeves 5 to the outer sleeve 10 by means of the ribs 9 of the compensation sections 7a, 7b, but advantageous, in order to avoid turning over the sealing collars formed by the spring legs 18a and 18b together with the inner sealing rings 5a or 5b respectively which are held thereon, if the line 2 is moved in and counter to the direction of introduction E, while the inner sealing surfaces 6a, 6b surround the line 2.

The annular groove 12 extending on the outer periphery of the sealing element 1 is not absolutely necessary, but advantageous in order to receive the material of the connecting web 19 which is widened by the line 2. In this case, the radial sealing lips 13 may advantageously be arranged in the in the annular groove 12, so that upon widening of the connecting web 19 they are pressed harder against the wall 115 of the housing.

The collar 14 and the entry contour 17 may be designed corresponding to the respective requirements in order to facilitate locking of the sealing element 1 on the housing 100 and introduction of the line into the passage opening 4 of the sealing element. The seal receptacle 116 is advantageously designed complementarily to the external contour of the sealing element 1.

The housing 100 does not inevitably have to be a connector housing, as in the present case, but may be any electronics housing whatsoever. Correspondingly, the cap 102 may also be designed in any manner whatsoever in order to lock the sealing element 1, but is not absolutely necessary for this. The line guide 102 may for example be a screwed cable gland.

Latching means 103 and mating latching elements 104 may be designed corresponding to the respective requirements. Also the cover 105, the passage 106 and the assembly opening 107 to the inner chamber 108 of the housing 100 may be adapted to the respective requirements. The line clamp 110, the fastening means 111, counter-fastening means 120 and the pressure application region 112 may be designed in any way whatsoever in order to form a line holder 109 for the line 2.

The invention claimed is:

1. A sealing element for sealing between an electric line and a housing, wherein the sealing element has an elastically expandable inner sleeve which has, in an axial direction of the sealing element, a passage opening for the line which has at least one inner sealing surface extending along its inner periphery, an outer sleeve surrounding the inner sleeve, which outer sleeve has at least one outer sealing surface extending along its outer periphery, and comprises at least one compensation section which is compressible in a radial direction of the sealing element and has a yieldingness which is greater than the yieldingness of the outer sleeve, the inner sleeve being coupled to the outer sleeve, and the inner sleeve being radially expandable into the compensation section, wherein the inner sleeve has at least one front inner sealing ring and at least one rear inner sealing ring and the radial deflectability of the at least one rear inner sealing ring is greater than the radial deflectability of the at least one front inner sealing ring.

2. A sealing element according to claim 1, wherein the inner sleeve, at least in sections, is held in movable manner in the radial direction relative to the outer sleeve.

3. A sealing element according to claim 1, wherein the yieldingness of the compensation section in the radial direction exceeds the yieldingness of the compensation section in the axial direction.

4. A sealing element according to claim 1, wherein the compensation section comprises a region of weakness and/or a recess which extends, at least in sections, along the inner and/or the outer periphery.

5. A sealing element according to claim 1, wherein at least one cutout is formed in the compensation section, by means of which cutout the yieldingness of the compensation section is increased.

6. A sealing element according to claim 1, wherein the compensation section comprises ribs arranged in a spoke-like manner which, at least in sections, hold the inner sleeve on the outer sleeve.

7. A sealing element according to claim 1, wherein the compensation section in the passage opening has an inner recess which, at least in sections, is set back relative to the sealing surface.

8. A sealing element according to claim 1, wherein the compensation section comprises at least one annular groove on the outer periphery of the sealing element.

9. A sealing element according to claim 1, wherein the inner sleeve is connected to the outer sleeve via a connecting web which extends along its outer periphery.

10. A sealing element according to claim 1, wherein a spring leg which in an axial cross-section of the sealing element, at least in sections, extends obliquely to a central axis of the sealing element holds the at least one inner sleeve in a radially resilient manner.

11. A sealing element according to claim 1, wherein the at least one front inner sealing ring and at least one rear inner sealing ring are spaced apart from each other in a direction of introduction of the sealing element which extends parallel to the axial direction.

12. A sealing element according to claims 1, wherein the inner sleeve and the outer sleeve extend along an insertion direction of the electric line when in an un-deflected position.

13. A sealing element according to claim 6, wherein the ribs, at least in sections, extend obliquely to a radius line which starts from an axial centre line of the sealing element.

14. A sealing element according to claim 8, wherein at least one outward-facing sealing lip extends in the at least one annular groove in the peripheral direction.

15. A sealing element according to claim 9, wherein the connecting web is arranged in the axial direction substantially at the level of the inner recess and/or of the at least one annular groove.

16. A sealing element for sealing between an electric line and a housing, wherein the sealing element has an elastically expandable inner sleeve which has, in an axial direction of the sealing element, a passage opening for the line which has at least one inner sealing surface extending along its inner periphery, an outer sleeve surrounding the inner sleeve, which outer sleeve has at least one outer sealing surface extending along its outer periphery, and comprises at least one compensation section which is compressible in a radial direction of the sealing element and has a yieldingness which is greater than the yieldingness of the outer sleeve, the inner sleeve being coupled to the outer sleeve, and the inner sleeve being radially expandable into the compensation section, wherein at least one cutout is formed in the compensation section, by means of which cutout the yieldingness of the compensation section is increased, wherein the inner sleeve has at least one front inner sealing ring and at least one rear inner sealing ring and the radial deflectability of the at least one rear inner sealing ring is greater than the radial deflectability of the at least one front inner sealing ring.

17. A sealing element according to claim 16, wherein the inner sleeve, at least in sections, is held in movable manner in the radial direction relative to the outer sleeve.

18. The sealing element according to claim 16, wherein the inner sleeve is connected to the outer sleeve via a connecting web which extends along its outer periphery.

19. A sealing element according to claim 18, wherein the connecting web is arranged in the axial direction substantially at the level of the inner recess and/or of the at least one annular groove.

* * * * *